United States Patent
Kawabe et al.

(10) Patent No.: US 12,023,811 B2
(45) Date of Patent: Jul. 2, 2024

(54) ROBOT CONTROL DEVICE AND ROBOT CONTROL METHOD

(71) Applicant: SONY GROUP CORPORATION, Tokyo (JP)

(72) Inventors: Yusuke Kawabe, Tokyo (JP); Kensuke Kitamura, Tokyo (JP); Katsuhisa Ito, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 154 days.

(21) Appl. No.: 17/425,365

(22) PCT Filed: Jan. 27, 2020

(86) PCT No.: PCT/JP2020/002686
§ 371 (c)(1),
(2) Date: Jul. 23, 2021

(87) PCT Pub. No.: WO2020/158642
PCT Pub. Date: Aug. 6, 2020

(65) Prior Publication Data
US 2022/0097230 A1    Mar. 31, 2022

(30) Foreign Application Priority Data
Jan. 31, 2019   (JP) ................ 2019-015697

(51) Int. Cl.
*B25J 9/16*      (2006.01)
*A63H 11/00*   (2006.01)
(Continued)

(52) U.S. Cl.
CPC ............ *B25J 9/1628* (2013.01); *A63H 11/00* (2013.01); *B25J 13/08* (2013.01); *B25J 13/088* (2013.01);
(Continued)

(58) Field of Classification Search
CPC .... A63H 11/00; A63H 2200/00; A63H 13/02; A63H 11/18; B25J 9/1628; B25J 13/08;
(Continued)

(56) References Cited

U.S. PATENT DOCUMENTS 6,754,560 B2 *   6/2004   Fujita ................. B25J 13/08
                                            704/E15.045
10,576,618 B2 *  3/2020   Otsuka ............... B25J 13/084
(Continued)

FOREIGN PATENT DOCUMENTS

CN        1460052 A      12/2003
CN        101432103 A    5/2009
(Continued)

OTHER PUBLICATIONS

International Search Report and Written Opinion of PCT Application No. PCT/JP2020/002686, dated Mar. 17, 2020, 11 pages of ISRWO.
(Continued)

*Primary Examiner* — Adam R Mott
*Assistant Examiner* — Sagar K C
(74) *Attorney, Agent, or Firm* — CHIP LAW GROUP

(57) ABSTRACT

The present disclosure provides a robot control device including a detection section that detects an external force applied to a movable part of a robot, on the basis of a parameter obtained from a joint driving the movable part, and a driving control section that controls an interaction of the robot, according to the detected external force. With this configuration, in a case where a user touches the robot, the robot can perform an interaction according to the touch.

15 Claims, 8 Drawing Sheets

(51) Int. Cl.
*B25J 13/08* (2006.01)
*B25J 9/00* (2006.01)

(52) U.S. Cl.
CPC ......... *A63H 2200/00* (2013.01); *B25J 9/0003* (2013.01)

(58) Field of Classification Search
CPC .... B25J 13/088; B25J 9/0003; B25J 11/0005; B25J 13/085
See application file for complete search history.

(56) References Cited

U.S. PATENT DOCUMENTS

| | | | | |
|---|---|---|---|---|
| 2003/0191560 A1* | 10/2003 | Yokoo | ................... | G06N 3/006 318/568.11 |
| 2004/0034449 A1* | 2/2004 | Yokono | ................. | B25J 9/1633 700/245 |
| 2009/0171505 A1* | 7/2009 | Okazaki | ................ | B25J 13/084 901/46 |
| 2014/0178847 A1* | 6/2014 | Akavia | ................ | A63H 33/042 434/308 |
| 2017/0095925 A1* | 4/2017 | Yamane | ................. | B25J 9/1633 |
| 2019/0389058 A1* | 12/2019 | Hayashi | ................ | B25J 9/0003 |

FOREIGN PATENT DOCUMENTS

| | | | |
|---|---|---|---|
| EP | 1386699 A2 | 2/2004 | |
| JP | 2000-158367 A | 6/2000 | |
| JP | 2001-327765 A | 11/2001 | |
| JP | 2002-239963 A | 8/2002 | |
| KR | 10-0864340 B1 | 10/2008 | |
| WO | 2002/065825 A2 | 8/2002 | |
| WO | WO-2007080733 A1 * | 7/2007 | |
| WO | 2008/004487 A1 | 1/2008 | |
| WO | WO 2017169826 A1 * | 3/2017 | |
| WO | WO-2017169826 A1 * | 10/2017 | ............. A63H 11/00 |

OTHER PUBLICATIONS

Office Action for JP Patent Application No. 2020-569604, issued on Mar. 5, 2024, 05 pages of English Translation and 05 pages of Office Action.

* cited by examiner

ROBOT CONTROL DEVICE AND ROBOT CONTROL METHOD

CROSS REFERENCE TO RELATED APPLICATIONS

This application is a U.S. National Phase of International Patent Application No. PCT/JP2020/002686 filed on Jan. 27, 2020, which claims priority benefit of Japanese Patent Application No. JP 2019-015697 filed in the Japan Patent Office on Jan. 31, 2019. Each of the above-referenced applications is hereby incorporated herein by reference in its entirety.

TECHNICAL FIELD

The present disclosure relates to a robot control device, a robot control method, and a program.

BACKGROUND ART

Regarding a conventional robot apparatus and a control method therefor, PTL 1 discloses making a reaction to any operation command from the outside upon receiving the operation command, and letting a user recognize an operation state achieved in response to the operation command.

CITATION LIST

Patent Literature

[PTL 1]
Japanese Patent Laid-Open No. 2000-158367

SUMMARY

Technical Problem

For example, it has been desired that, in a case where a user touches, for example, an animal-type robot as a home robot, the robot reacts in a manner similar to how actual animals do.

The technology disclosed in PTL 1 is assumed to be provided to, when the robot detects a sound as an operation command, let a user recognize an operation state achieved in response to the operation command. However, any reaction caused by an interaction in a case where the user touches the robot is not taken into consideration at all.

Therefore, a technology in which, in a case where a user touches a robot, the robot performs an interaction in response to the touch has been demanded.

Solution to Problem

The present disclosure provides a robot control device including a detection section that detects an external force applied to a movable part of a robot, on the basis of a parameter obtained from a joint driving the movable part, and a driving control section that controls an interaction of the robot, according to the detected external force.

In addition, the present disclosure provides a robot control method including detecting an external force applied to a movable part of a robot, on the basis of a parameter obtained from a joint driving the movable part, and controlling an interaction of the robot, according to the detected external force.

In addition, the present disclosure provides a program for causing a computer to function as means for detecting an external force applied to a movable part of a robot, on the basis of a parameter obtained from a joint driving the movable part, and means for controlling an interaction of the robot, according to the detected external force.

DESCRIPTION OF EMBODIMENTS

Preferable embodiments of the present disclosure will be explained in detail with reference to the attached drawings. It is to be noted that components having substantially the same functional configuration will be denoted by the same reference signs throughout the present description and the drawings, a redundant explanation thereof will be omitted.

It is to be noted that the explanation will be given according to the following order.

1. Configuration of Robot Apparatus
2. Configuration of Control device
3. Configuration of External-force Detection System
4. Configuration of Control Section
5. Examples of Interaction of Robot Apparatus
5.1. Interaction According to Touch Point
5.2. Interaction According to Touch Strength
5.3. Interaction According to Touching Manner
5.4. Interaction According to Person Who Makes Touch
5.5. Interaction According to Emotion
5.6. Interaction According to Frequency of Touches
5.7. Examples of Motion
5.8. Actual Examples of Interaction
5.9. Actual Examples Excluding Interactions with User
6. Process Which Is Performed by Control Section

1. Configuration of Robot Apparatus

Figure 1:
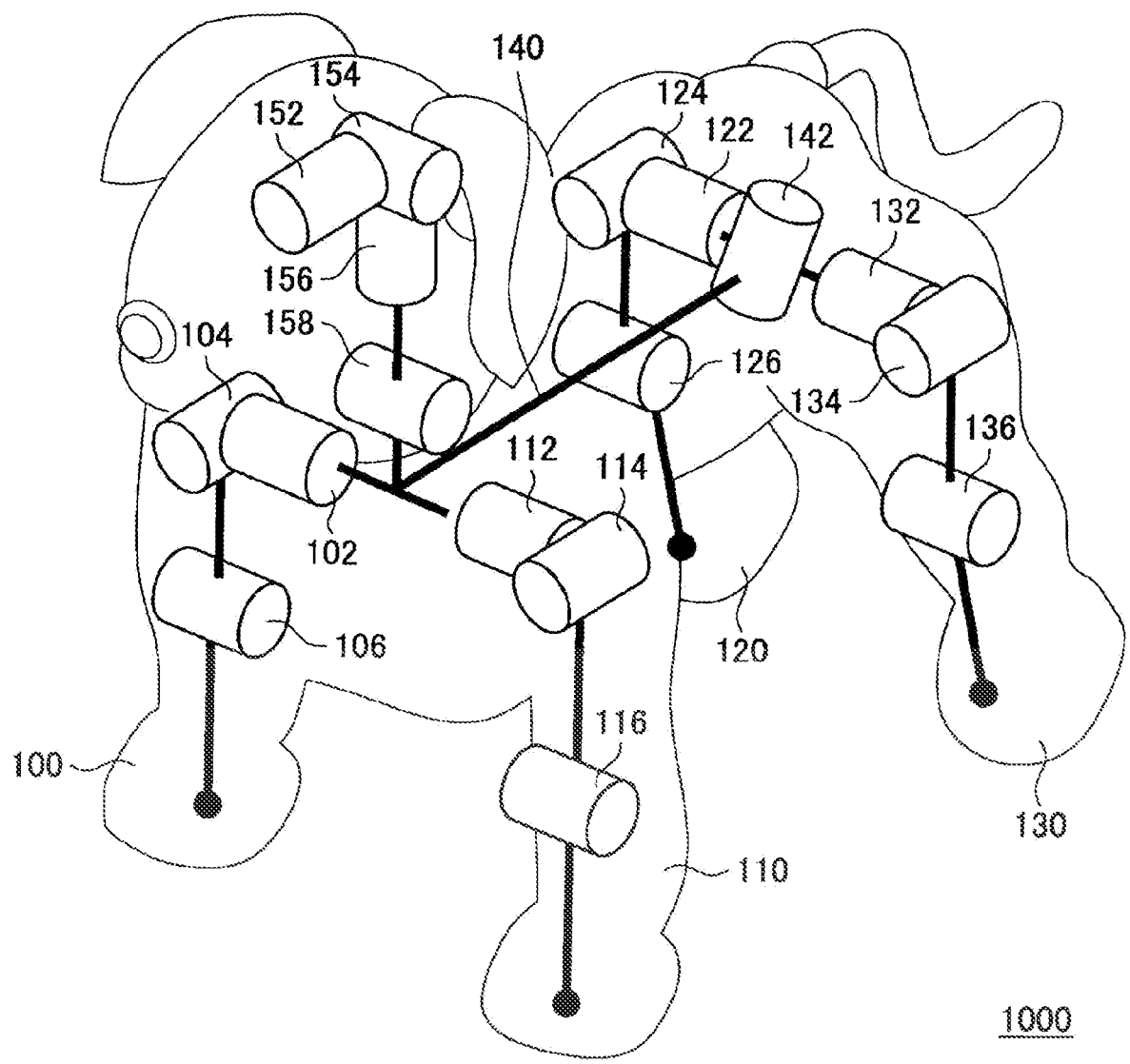
FIG. 1 is a schematic view of an external appearance of a robot apparatus and rotational shafts of joints.

FIG. 1 is a schematic view of an external appearance of a robot apparatus 1000 according to one embodiment of the present disclosure and rotational shafts of joints. The robot apparatus 1000 includes four legs 100, 110, 120, and 130 that are each driven by an electric motor such as a servo motor.

As depicted in FIG. 1, the robot apparatus 1000 includes a plurality of joint parts. Here, for convenience of explanation, the robot apparatus 1000 is divided, on the basis of its movements, into a right foreleg line, a left foreleg line, a right hind leg line, a left hind leg line, a body line, and a head line. The right foreleg line includes a joint part 102, a joint part 104, and a joint part 106. The left foreleg line includes a joint part 112, a joint part 114, and a joint part 116. The right hind leg line includes a joint part 122, a joint part 124, and a joint part 126. The left hind leg line includes a joint part 132, a joint part 134, and a joint part 136. Further, the body line includes a joint part 142. The head line includes a joint part 152, a joint part 154, a joint part 156, and a joint part 158. These lines are connected to a trunk 140. It is to be noted that the joint parts depicted in FIG. 1 represent main joint parts that are each driven by an electric motor. Besides the joint parts depicted in FIG. 1, joint parts that move so as to follow a movement of another joint part are included in the robot apparatus 1000. In addition, the robot apparatus 1000 includes a plurality of movable parts such as a mouth, ears, a tail, etc. These movable parts are also each driven by an electric motor or the like.

In FIG. 1, the joint parts are indicated by respective cylinders. In each of the joint parts, the center axis of the cylinder corresponds to the rotational shaft of the joint part. Since the joint part 152 is provided in the head line, an action of tilting the head to the right and left sides in a case where the robot apparatus 1000 is viewed from the front side is executed. In addition, since the joint part 142 is provided in the body line, an action of swinging the backside to the right and left sides in a case where the robot apparatus 1000 is viewed from above is executed. Accordingly, the robot apparatus 1000 can execute a great variety of actions much more than ever before.

Each of the joint parts is driven by an electric motor (hereinafter, simply referred to as a motor) such as a servo motor. It is to be noted that no particular limitation is placed on the driving source. The motors of the respective joint parts, a gear mechanism, an encoder, and a microcontroller for driving the motors are all housed in one box. The box is formed from a resin material (e.g., plastic). The motors and the gear mechanism are housed in the one box, and the box is sealed. Accordingly, the silence property of the robot apparatus 1000 can be enhanced.

For example, in the right hind leg line, the motors of the joint part 132 and the joint part 134, the gear mechanism, the encoder, and the microcontroller are housed in one box, and the box forms two rotational shafts. On the other hand, the motor of the joint part 136, the gear mechanism, and the microcontroller are housed in one box, and the box forms one rotational shaft. Also, in the head line, the joint part 152, the joint part 154, and the joint part 156 form three rotational shafts.

It is to be noted that, since the two rotational shafts are housed in one box, a spherical joint can be realized. Also, since the two rotational shafts are housed in one box, a space for the joint parts can be reduced, so that the shape of the robot apparatus 1000 can be decided with the designability emphasized.

The above-mentioned lines including the right fore leg line, etc., are controlled by the microcomputers of the respective joint parts. For example, among the joint parts, the joint part 158 in the head line is configured in such a way that a brake is electrically applied thereto. If the joint part 158 can be freely rotated during a power off time or the like, the head part may go down to hit a user's hand or the like. Such a situation can be avoided when a brake is applied to the joint part 158. The brake can be applied by a method of determining the rotation of the motor of the joint part 158 during a power off time on the basis of an electromotive force generated by the rotation of the motor, and generating a driving force in a direction opposite to the rotational direction of the motor.

Figure 2:
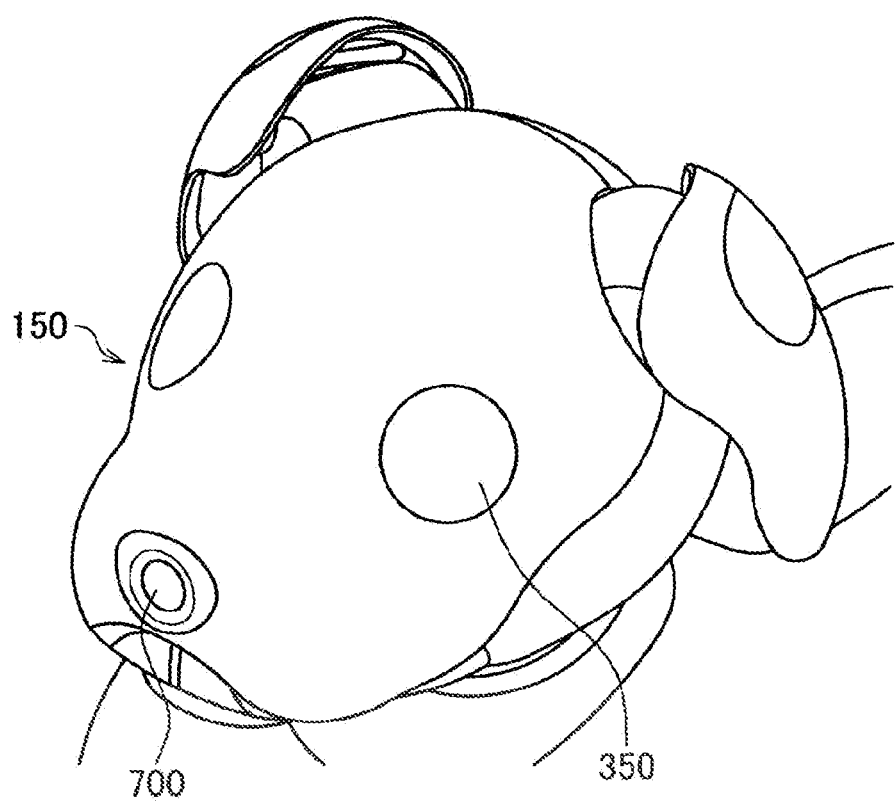
FIG. 2 is a schematic view of a head part of the robot apparatus.

FIG. 2 is a schematic view of a head part 150, or particularly, a face of the robot apparatus 1000. Eyes 350 of the robot apparatus 1000 depicted in FIG. 2 are configured to perform various motions and various displays, according to an action of the robot apparatus 1000. Therefore, the left and right eyes 350 of the robot apparatus 1000 include respective light emission type display devices (OLED).

2. Configuration of Control Device

Figure 3:
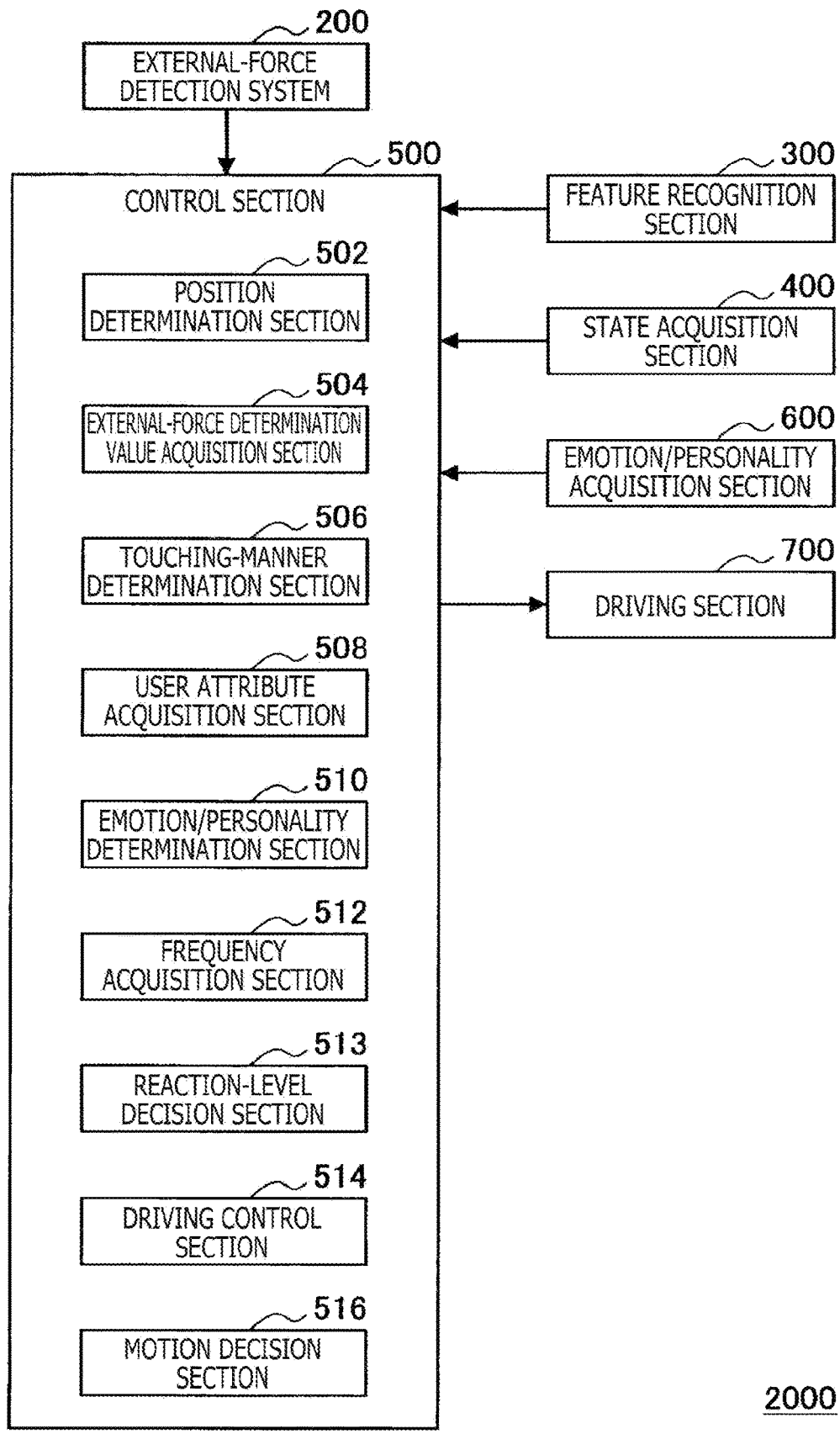
FIG. 3 is a schematic view of a configuration of a control device that controls the robot apparatus.

FIG. 3 is a schematic view of a control device 2000 that controls the robot apparatus 1000. The control device 2000 is installed in the robot apparatus 1000. As depicted in FIG. 3, the control device 2000 includes an external-force detection system 200, a feature recognition section 300, a state acquisition section 400, a control section 500, an emotion/personality acquisition section 600, and a driving section 700.

The external-force detection system 200 detects information (an external force determination value) indicating whether or not an external force is applied from each of the respective motors of the joints of the robot apparatus 1000. The feature recognition section 300 includes a camera, an inertial measurement unit (IMU), and the like, and recognizes whether a user touches the robot apparatus 1000, or whether a user gives a pat on the robot apparatus 1000, for example. The feature recognition section 400 recognizes a feature in an image captured by the camera, through image processing of the captured image.

The state acquisition section 400 includes a camera or the like and acquires the peripheral state of the robot apparatus 1000, or particularly, a feature of a user who is touching the robot apparatus 1000. As depicted in FIG. 2, a camera 700 is mounted on the nose of the robot apparatus 1000. The camera 700 corresponds to the camera of the feature recognition section 300 and the camera of the state acquisition section 400. The driving section 700 corresponds to the motor, the encoder, and the gear mechanism of each joint.

The control section 500 obtains information regarding a touch point, a touch strength, etc., by using determination values obtained from the external-force detection system 200. Information regarding a touch point and a touching manner can be obtained on the basis of determination values obtained from the external-force detection system 200 because the external-force detection system 200 is provided to each joint. The control section 500 can further obtain information regarding a touching manner, etc., through machine learning by using an external force determination value obtained by the external-force detection system 200, a recognition result obtained by the feature recognition section 300, and a state acquisition result obtained by the state acquisition section 400. On the basis of the information regarding the touching manner, etc., the control section 500 controls the driving section 700 of each joint.

The emotion/personality acquisition section 600 acquires the emotion and personality of the robot apparatus 1000. Any one of plural emotions can be set for the robot apparatus 1000, according to the present state. The emotion/personality acquisition section 500 acquires the emotion of the robot apparatus 1000 set at the moment. Examples of the emotion to be set include "anger," "pleasure," and "sadness."

In addition, the robot apparatus 1000 has an innately set personality or an acquired personality. The emotion/personality acquisition section 600 acquires the set personality of the robot apparatus 1000. Examples of the emotion to be set include "wild," "cute," "shy," and "affectionate."

On the basis of information regarding the emotion and the personality, the control section 500 provides an interaction optimum for a user, or selects an action optimum for the robot apparatus 1000 itself, in response to a response from the external-force detection system 200.

3. Configuration of External-Force Detection System

Figure 4:
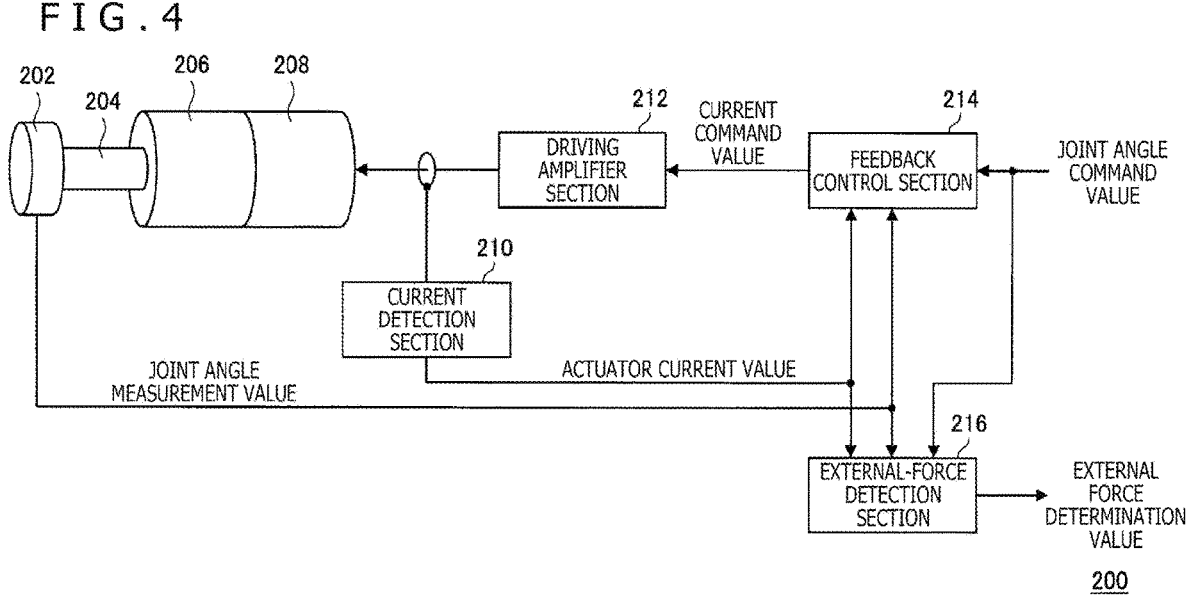
FIG. 4 is a schematic view of a configuration of an external-force detection system.

Next, a configuration of the external-force detection system 200 will be explained. FIG. 4 is a schematic view of the configuration of the external-force detection system 200. The external-force detection system 200 is provided to each of the joints of the robot apparatus 1000. As depicted in FIG. 4, the external-force detection system 200 includes a joint angle sensor 202, an output shaft 204, a gear mechanism 206, a motor 208, a current detection section 210, a driving amplifier section 212, a feedback control section 214, and an external-force detection section 216. The external-force detection system 200 is capable of estimating an external force without using any mechanism, such as a torque sensor or a touch sensor, for detecting a force. If an output from the external-force detection system 200 is used, the robot apparatus 1000 can express an expression in response to an action that has been taken by a user to the robot apparatus.

The motor 208 outputs a driving force for driving the corresponding joint. The gear mechanism 206 decelerates the output from the motor 208. The output shaft 204 outputs the driving force having undergone the deceleration at the gear mechanism 206. The joint is driven with the driving force outputted from the output shaft. The joint angle sensor 202 corresponds to the above-mentioned encoder and detects the angle of the joint.

A joint angle command value is inputted to the feedback control section 214. The joint angle command value is also inputted to the external-force detection section 216. A current command value is inputted from the feedback control section 214 to the driving amplifier section 212. The current command value is a command value for designating a drive amount of the motor 208. The driving amplifier section 212 amplifies the current command value and outputs the resultant value. The current amplified by the driving amplifier section 212 flows to the motor 208, so that the motor 208 is driven. Here, the current detection section 210 detects the current (actuator current value) flowing through the motor 208. The external-force detection section 216 detects an external force on the basis of the actuator current value detected by the current detection section 210, the joint angle measurement value measured by the joint angle sensor 202, and the joint angle command value.

Figure 5:
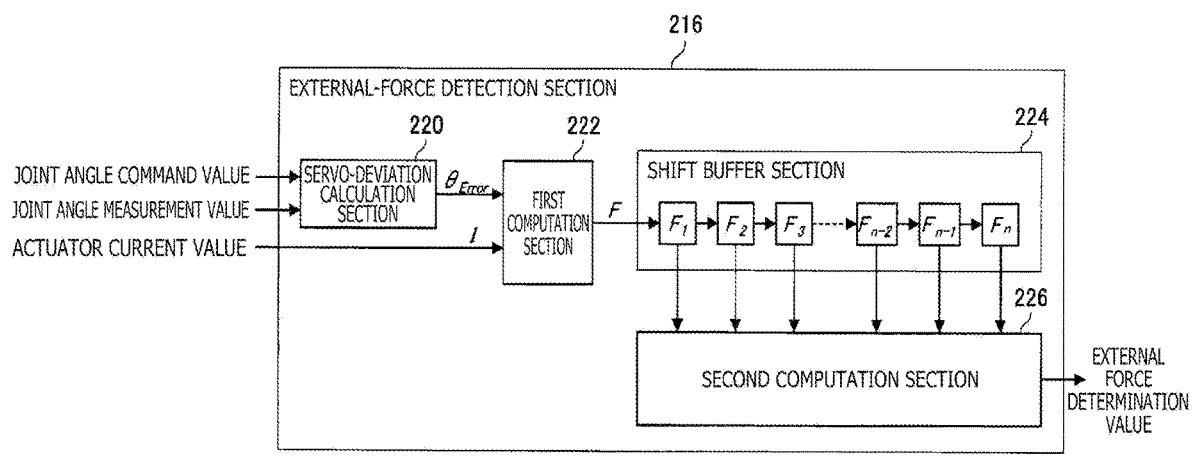
FIG. 5 is a schematic view of a configuration of an external-force detection section.

FIG. 5 is a schematic view of a configuration of the external-force detection section 216. As depicted in FIG. 5, the external-force detection section 216 includes a servo-deviation calculation section 220, a first computation section 222, a shift buffer section 224, and a second computation section 226. The external-force detection section 216 acquires the joint angle command value, the joint angle measurement value, and the actuator current value in time series and determines whether or not any external force has been applied to the corresponding joint.

A joint angle command value and a joint angle measurement value are inputted to the servo-deviation calculation section 220. The servo-deviation calculation section 220 calculates a deviation $\theta_{Error}$ between the joint angle command value and the joint angle measurement value. The deviation $\theta_{Error}$ and an actuator current value I are inputted to the first computation section 222.

From the deviation $\theta_{Error}$ and the actuator current value I, the first computation section obtains an output F according to Expression (1) below.

$$F = a \times \theta_{Error} \times I + b \times \theta_{Error} + c \times I + d \qquad (1)$$

In the above-mentioned manner, the servo deviation $\theta_{Error}$, which is the deviation between the joint angle command value and the joint angle measurement value, and the actuator current value I flowing through the actuator are inputted to the first computation section 222, so that the output F is acquired. The coefficients a, b, c, and d in Expression (1) are appropriately decided by a machine learning method or the like.

As depicted in FIG. 5, the output F is inputted to the shift buffer section 224. As a result of input of the output F to the shift buffer section 224, n pieces of successive time-series data are sequentially acquired. The n pieces of time-series data are inputted to the second computation section 226. The second computation section 226 conducts a computation on the n pieces of time-series data and outputs the resultant value as an external force determination value. In the computation which is conducted by the second computation section 226, the average value of the n pieces of time-series data may be computed to eliminate noise in the time direction. Alternatively, in the computation which is conducted by the second computation section 226, a high frequency may be eliminated through a filter, or a binarized value may be obtained through a hysteresis comparator. In this case, in a case where the external force determination value is equal to or greater than a threshold, it is determined that a "touch has been made." Also, in the computation which is conducted by the second computation section 226, a computing unit obtained by a machine learning method may be used. It is to be noted that, besides the time-series information regarding the output F, time-series information regarding the joint angle command value (joint angular speed or attitude information) may be inputted to the second computation section 226.

4. Configuration of Control Section

As depicted in FIG. 3, the control section 500 includes a position determination section 502, an external force determination value acquisition section 504, a touching-manner determination section 506, a user attribute acquisition section 508, an emotion/personality determination section 510, a frequency acquisition section 512, a reaction-level decision section 513, a driving control section 514, and a motion decision section 516. It is to be noted that each of the components in the control section 500 can include a circuit (hardware) or a central processing unit such as a CPU and of a program (software) for causing the circuit to operate.

The position determination section 502 determines on which part of the robot apparatus 1000 a user has made a touch. The external force determination value acquisition section 504 acquires an external force determination value detected by the external-force detection system 200. The touching-manner determination section 506 determines the manner of the user's touch made on the robot apparatus 1000 on the basis of information recognized by the feature recognition section 300. The user attribute acquisition section 508 acquires information regarding the attribute of the user, such as information indicating whether the user who has touched the robot apparatus 1000 is a stranger or an owner of the robot apparatus 1000, on the basis of information acquired by the state acquisition section 300, or particularly, facial image information.

The emotion/personality determination section 510 determines the emotion and the personality of the robot apparatus 1000 on the basis of the emotion and the personality of the robot apparatus 1000 acquired by the emotion/personality acquisition section 600. The frequency acquisition section 512 acquires the frequency with which the user touches the robot apparatus 1000. When the robot apparatus 1000 performs an interaction, the motion decision section 516 decides a motion to be provided, according to a user's touch point, the magnitude of an external force during the touch, the touching manner, the user attribute, the emotion, the personality, the frequency of touches, etc. The reaction-level decision section 513 decides a reaction level when the interaction is performed, according to the magnitude of an external force when the touch is made, the touching manner, the user attribute, the emotion, the personality, the frequency of touches, etc. The driving control section 514 controls the driving section 700 according to the position of the user's touch, the magnitude of the external force when the touch is made, the touching manner, the user attribute, the emotion, the personality, and the frequency of touches, thereby controls an interaction of the robot apparatus 1000.

5. Examples of Interaction of Robot Apparatus

Next, an interaction to be performed when a user touches the robot apparatus 1000 will be explained. In the present embodiment, in a case where a user touches or gives a pat on the robot apparatus 1000, the external-force detection system 200 detects an external force that is applied during the touch or the pat, so that an interaction according to the external force determination value is performed. In this case, a motion of the robot apparatus 1000 is decided according to the position of the touch, the strength of the touch, the touching manner, a person who has made the touch, the robot's emotion, the frequency of touches, etc., and an interaction is performed.

5.1. Interaction According to Touch Point

An interaction of the robot apparatus 1000 is configured to make a reaction corresponding to a touched block in a case where the robot apparatus 1000 is divided into plural blocks. The blocks include an ear, a head part and a neck, a leg, a tail, etc. For example, in a case where a user touches the tail, an interaction of wagging the tail is performed.

In addition, an interaction varies according to a touch point. For example, in a case where the touch point is the tail, a reaction of wagging the tail is made, and, in a case where the touch point is the head part, the reaction of shaking the head is made. A reaction similar to that of an actual animal can be produced by the robot apparatus 1000. The touch point can be obtained, on the basis of an external force determination value, from a joint where the external force determination value is obtained. In addition, in a case where touch sensors for the arms, the legs, the tail, etc. are provided, the touch point can be determined from detection values obtained by the touch sensors.

5.2. Interaction According to Touch Strength

Figure 6:
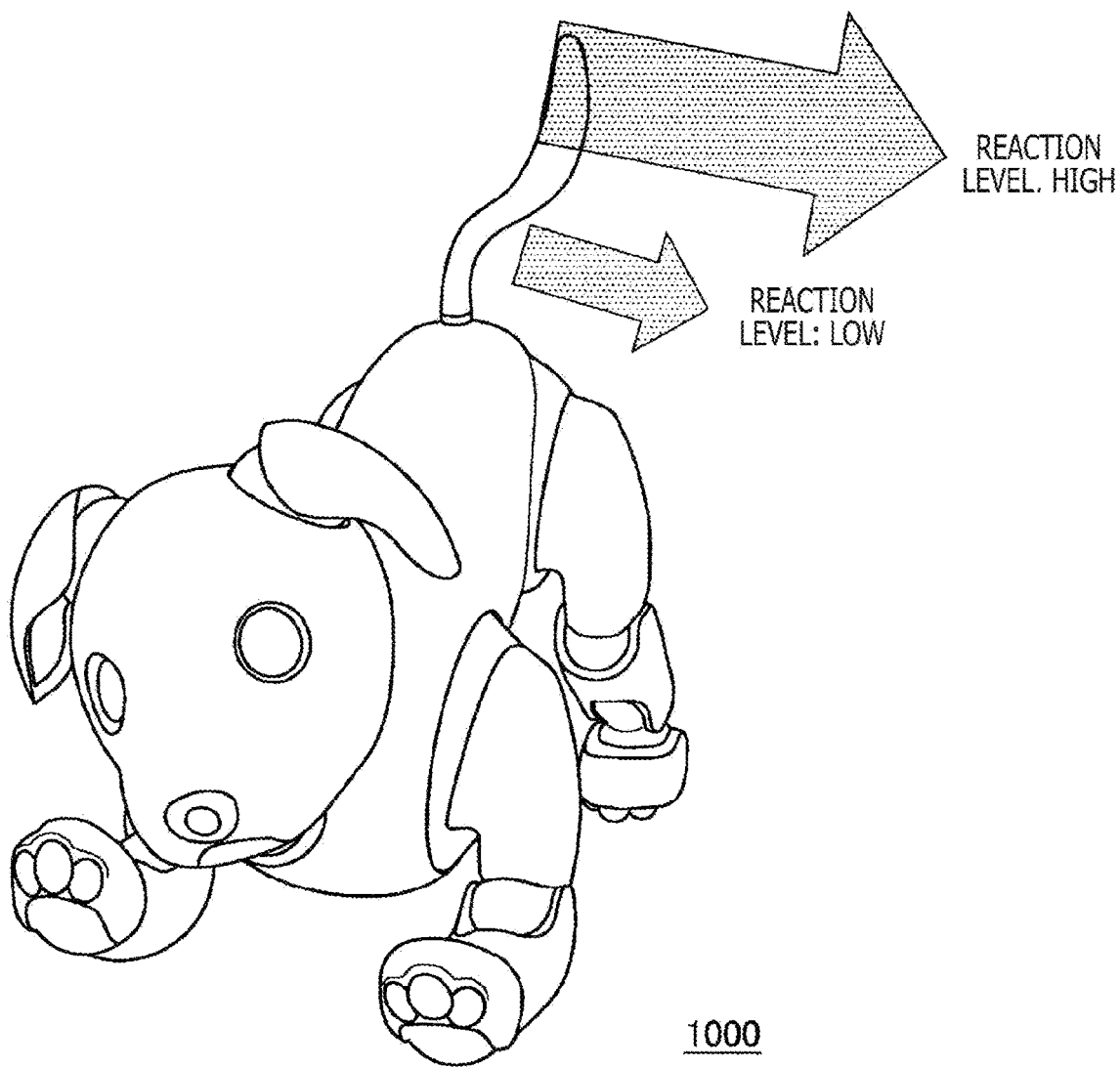
FIG. 6 is a schematic view of a situation where an interaction varies according to a touch strength.

An interaction of the robot apparatus 1000 varies according to a touch strength. FIG. 6 is a schematic view of a situation where the interaction varies according to a touch strength. In FIG. 6, the size of an arrow indicates a touch strength. For example, it is assumed that a touch on the end of the tail is made. In a case where the touch on the end of the tail is strong, a large reaction is made, so that the tail is wagged largely. On the other hand, in a case where the touch on the end of the tail is weak, a small reaction is made, so that the tail is wagged slightly. The touch strength can be obtained from the external force determination value.

5.3. Interaction According to Touching Manner

An interaction of the robot apparatus 1000 varies according to a touching manner. For example, in a case where, while the tail is moving, the tail is forcedly moved to a direction opposite to the moving direction, a large reaction is made. On the other hand, in a case where the tail at rest is moved, a small reaction is made. In addition, an interaction of the robot apparatus 1000 varies also according to the touching manner such as slapping or patting. For example, in a case where the robot apparatus 1000 is slapped, a large reaction is made. In a case where the robot apparatus 1000 is patted, a reaction is made. The touching manner is determined by the touching-manner determination section 506 of the control section 500. The touching manner can be obtained from the magnitude of the external force determination value. Alternatively, the touching manner can be obtained by machine learning of measurement values obtained by an inertia measuring unit of the feature recognition section 300.

5.4. Interaction According to Person Who Makes Touch

Figure 7:
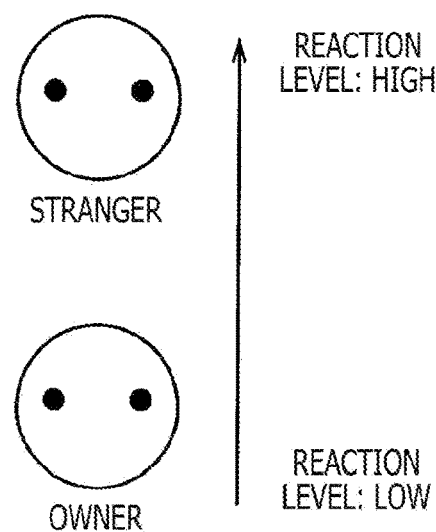
FIG. 7 is a schematic view of a situation where an interaction varies according to a person who makes a touch.

An interaction of the robot apparatus 1000 varies according to a person who makes a touch. FIG. 7 is a schematic view of a situation where the interaction varies according to a person who makes a touch. As depicted in FIG. 7, in a case where a stranger who has not been recognized by the robot apparatus 1000 makes a touch, a large reaction is made. On the other hand, in a case where an owner of the robot apparatus 1000 who has been well recognized by the robot apparatus 1000 makes a touch, a small reaction is made. Therefore, the reaction becomes large for a person to whom the robot apparatus 1000 is not obedient, while the reaction becomes small for the owner to whom the robot apparatus 1000 is obedient. The attribute of a person who makes a touch is acquired by the user attribute acquisition section 508 of the control section 500.

5.5. Interaction According to Emotion

Figure 8:
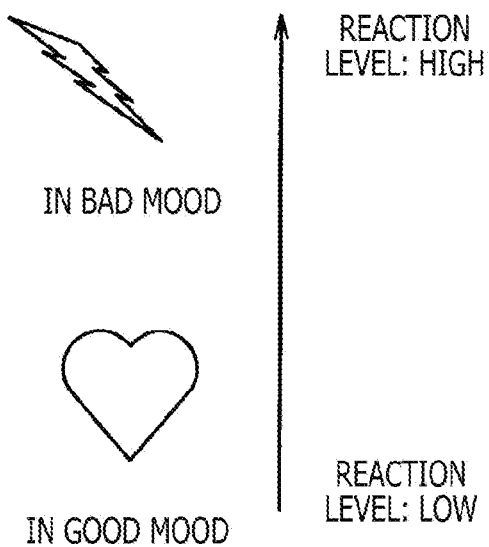
FIG. 8 is a schematic view of a situation where an interaction varies according to an emotion.

An emotion is set for the robot apparatus 1000, as explained above. An interaction of the robot apparatus 1000 varies according to the emotion of the robot apparatus 1000. FIG. 8 is a schematic view of a situation where the interaction varies according to the emotion. As depicted in FIG. 8, when the robot apparatus 1000 is in a bad mood, a large reaction is made. Also, in a case where the robot apparatus 1000 has a happy emotion, a small reaction is made.

5.6. Interaction According to Frequency of Touches

Figure 9:
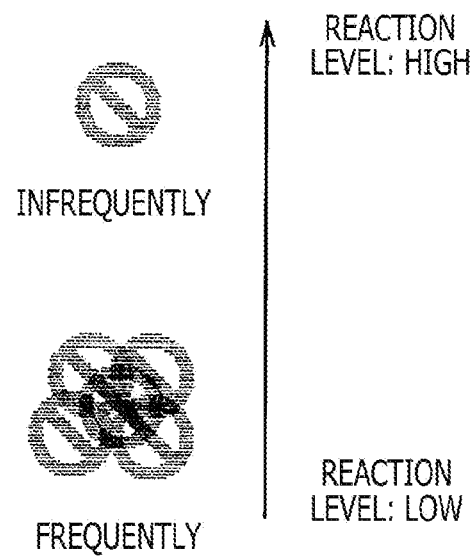
FIG. 9 is a schematic view of a situation where an interaction varies according to the frequency of user's touches.

An interaction of the robot apparatus 1000 varies according to the frequency of user's touches. FIG. 9 is a schematic view of a situation where the interaction varies according to the frequency of user's touches. As depicted in FIG. 9, in a case where the frequency of user's touches is low, a large reaction is made. On the other hand, in a case where the frequency of user's touches is high, a small reaction is made. That is, the robot dislikes a touch that is made for the first time, but the reaction becomes gradually smaller with an increase of the number of times of making touches.

5.7. Examples of Motion

A motion in the interaction of the robot apparatus 1000 is decided by the motion decision section 514 on the basis of a motion decision parameter. For example, when a parameter acquired for a touch strength, a weight component of a touch strength, a parameter acquired for a touching manner, a weight component of a touching manner, a parameter acquired for a person who makes a touch, a weight component of a person who makes a touch, a parameter acquired for an emotion, a weight component of an emotion, a parameter acquired for a frequency, and a weight component of a frequency, are defined as b, w2, c, w3, d, w4, e, w5, f, and w6, respectively, a motion reaction level can be expressed by the following expression.

Motion reaction level=$b w2 \times c w3 \times d w4 \times e w5 \times f w6$

It is to be noted that the weight components (w2 to w6) are changed according to the personality and the character of the robot apparatus. For example, in a case where the robot apparatus is like a trained friendly dog that is accustomed to interacting with anyone else, it is sufficient if the weight component w4 for the person d who makes a touch is set to significantly small.

Hereinafter, six examples of the motion will be described. It is to be noted that motions of the six examples are larger in the following order.
- (Head part) Biting/(Tail) Waging the tail upward and downward
- (Head part) Swinging the head/(Tail) Waging the tail largely twice
- (Head part) Swiftly swinging the head toward the force direction/(Tail) Finely vibrating in the up-down direction
- (Head part) Slowly swinging the head toward the force direction/(Tail) Slowly waging once
- (Head part) Exhibiting a resistance against the force direction/(Tail) Slowly moves upward and then quickly moves downward

5.8. Actual Examples of Interaction

Actual examples of an interaction that is performed by the above-mentioned method will be described below.
- When being pulled in the axial direction, the tail is swiftly drawn toward the body side and wags at least one time so as to shake the tail free from the external force.
- When being rotated about the axis, the tail rotates in a direction the same as the rotation direction so as to release the force.
- When being rotated about the axis, the tail rotates in a direction opposite to the rotation direction so as to return the force.
- When being moved up, the tail swiftly wags downward so as to shake the tail free from the force, and, when being moved down, the tail swiftly wags upward so as to shake the tail free from the force.
- When being shaken rightward and leftward, the tail returns to the axis center and vibrates in the up-down direction.
- When being finely rotated with the base of the tail held, the tail moves upward and finely vibrates at least once (Pleasure)
- When a close person (e.g., an owner) touches the tail, the reaction becomes small.
- When a stranger touches the tail, the reaction becomes large.
- In a case where the number of touching the tail is N or more during a certain previous period of time, a small reaction is made for the next touch (Getting familiar)
- In a case where the number of touching the tail is M or less during a certain previous period of time, a large reaction is made for the next touch (Astonishment)
- When the robot is excited, a large reaction is made, and, when the robot is calm, a small reaction is made.

A reaction by the interaction may be taken at a block other than the touched blocked. In a case where the reaction level is low, a reaction using the eyes or a voice may be taken without driving the driving section. For example, the expression in the eyes may be changed to indicate a state in which the robot apparatus is feeling comfortable such that the robot apparatus behaves to ask more touches. For example, the robot apparatus may behave to ask more touches by whining to fawn on the user.

In addition, in a case where a block touched by the user is the head part and the reaction level of the head part is excessively high, motions may be taken by not only the head part but also the leg blocks, so that an action of refusing the touch is taken by the entire body.

5.9. Actual Examples Excluding Interactions with User

Hereinafter, actual examples excluding interactions with a user will be described.
- In a case where an external force is detected in the vicinity of a wall where a ToF sensor installed on the nose of the robot apparatus 1000 cannot take any reaction, it is determined that the robot apparatus is in contact with the wall, and the action plan is changed.
- During what is called "shaking hands," which is an action of extending a front leg of the robot toward an owner's hand, an external force obtained from the user is registered as the personality of the robot and is set as a robot action selection element. For example, when an owner gently "shakes hands," a robot of the owner gently reacts with the "shake hand." On the other hand, when an owner forcibly "shakes hands," a robot of the owner also wildly reacts with the "shake hands."
- A hard or soft object, which cannot be determined by the feature recognition section 300, is identified. For example, an external force detection value obtained by an action of pushing the driving section toward a target object such as clay is used to be able to identify a hard or soft object. Similarly, the hardness or softness of a floor surface is determined, so that the raw material of the floor surface can be determined.

6. Process Which is Performed by Control Section

Figure 10:
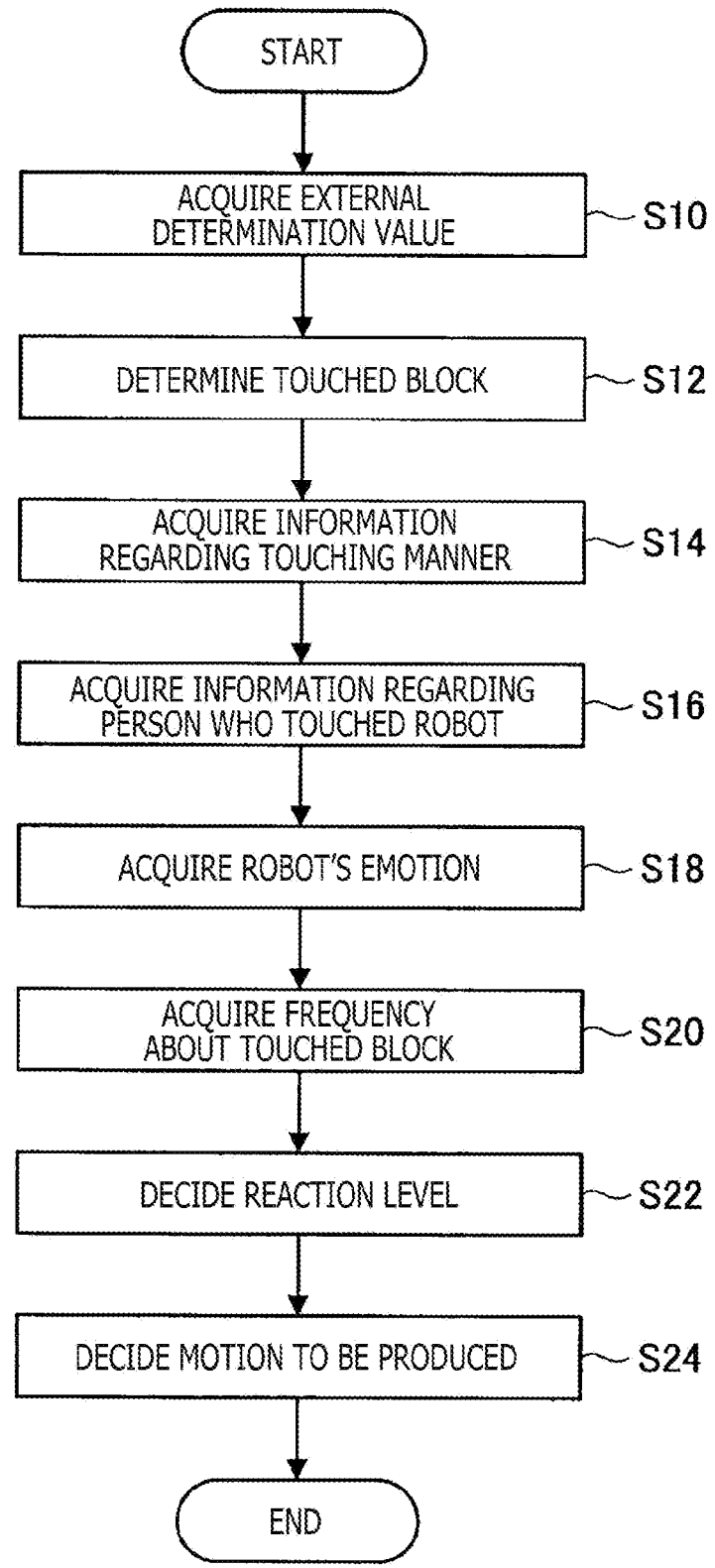
FIG. 10 is a flowchart depicting a process which is performed by a control section.

FIG. 10 is a flowchart depicting a process which is performed by the control section 500. The process in FIG. 10 is performed every predetermined control cycle. First, in step S10, an external force determination value is acquired from the external-force detection system 200. Next, in step S12, the position determination section 502 determines a block on which a user made a touch, among plural blocks included in the robot apparatus 1000. Specifically, in step S12, on which one of the blocks including the ears, the head part and the neck, the legs, and the tail the user made a touch is determined.

Next, in step S14, the touching-manner determination section 506 acquires information regarding the touching manner when the user touched the robot apparatus 1000 and determines the touching manner. Next, in step S16, the user attribute acquisition section 508 acquires information regarding the person who touched the robot apparatus 1000. Next, in step S18, the emotion/personality determination section 510 acquires the emotion of the robot apparatus 1000. Next, in step S20, the frequency acquisition section 512 acquires the frequency of past touches made on the touched block. Next, in step S22, the reaction-level decision section 513 decides a reaction level in an interaction. Next, in step S24, the motion decision section 516 decides a motion to be produced. After step S24, the process ends.

The preferred embodiments of the present disclosure have been explained above with reference to the attached drawings. However, the technical scope of the present disclosure is not limited to these embodiments. It is clear that a person ordinarily skilled in the technical field of the present disclosure can conceive of arriving at various changes and modifications within the scope of the technical scope set forth in the claims. It is understood that such changes and modifications also naturally fall within the technical scope of the present disclosure.

In addition, it is to be noted that the effects described in the present description are just explanatory or exemplary effects, and thus, are not limited. That is, the technology according to the present disclosure can provide any other effect that is clear to a person skilled in the art from the explanation given by the present description, in addition to or in place of the above-mentioned effects.

It is to be noted that the techn scope of the present disclosure also encompasses the following configurations.

(1)
A robot control device including:
a detection section that detects an external force applied to a movable part of a robot, on the basis of a parameter obtained from a joint driving the movable part; and
a driving control section that controls an interaction of the robot, according to the detected external force.

(2)
The robot control device according to (1), in which
the detection section detects the external force without carrying out any direct force sensing.

(3)
The robot control device according to (1) or (2), in which
the driving control section varies a reaction of the robot in the interaction, according to a position where the external force is applied to the movable part.

(4)
The robot control device according to any one of (1) to (3), in which
the driving control section varies a reaction of the robot in the interaction, according to a magnitude of the external force applied to the movable part.

(5)
The robot control device according to (4), in which,
when the external force is larger, the driving control section sets the reaction to be larger.

(6)
The robot control device according to any one of (1) to (5), in which the driving control section varies a reaction of the robot in the interaction, according to an attribute of a user who touches the movable part with the external force.

(7)
The robot control device according to (6), in which,
when a robot's degree of recognition of the user is higher, the driving control section sets the reaction to be larger.

(8)
The robot control device according to any one of (1) to (7), in which
the driving control section varies a reaction of the robot in the interaction, according to an emotion set for the robot.

(9)
The robot control device according to (8), in which,
when the emotion is more negative, the driving control section sets the reaction to be larger.

(10)
The robot control device according to any one of (1) to (9), in which
the driving control section varies a reaction of the robot in the interaction, according to a frequency with which the external force is applied.

(11)
The robot control device according to (10), in which,
when the frequency with which the external force is applied is lower, the driving control section sets the reaction to be larger.

(12)
The robot control device according to any one of (1) to (11), in which
the detection section detects the external force on the basis of a measurement value obtained by a joint angle sensor that measures an angle of the joint, a current value in a motor that drives the joint, and a command value for the angle of the joint.

(13)
The robot control device according to (12), in which
the detection section estimates the external force on the basis of the current value and a deviation between the measurement value and the command value.

(14)
A robot control method including:
detecting an external force applied to a movable part of a robot, on the basis of a parameter obtained from a joint driving the movable part; and
controlling an interaction of the robot, according to the detected external force.

(15)
A program for causing a computer to function as:
means for detecting an external force applied to a movable part of a robot, on the basis of a parameter obtained from a joint driving the movable part; and
means for controlling an interaction of the robot, according to the detected external force.

REFERENCE SIGNS LIST

200: External-force detection system
514: Driving control section
1000: Robot apparatus
2000: Control device

The invention claimed is:
1. A robot control device, comprising:
circuitry configured to:

detect an external force determination value, which indicates whether an external force is applied to a movable part of a robot, from a motor associated with a joint of the robot;

obtain information associated with a touching manner based on an application of machine learning using the external force determination value, a state of the robot, and a feature of a user who touches the robot, wherein the touching manner is a manner of a touch of the user on the robot;

detect the external force based on a parameter obtained from the joint driving the movable part;

control an interaction of the robot based on the detected external force; and control the motor associated with the joint based on the information associated with the touching manner.

2. The robot control device according to claim 1, wherein the circuitry is further configured to detect the external force without direct force sensing mechanism.

3. The robot control device according to claim 1, wherein the circuitry is further configured to vary a reaction of the robot in the interaction based on a position of the touch of the user at which the external force is applied to the movable part.

4. The robot control device according to claim 1, wherein the circuitry is further configured to vary a reaction of the robot in the interaction based on a magnitude of the external force applied to the movable part.

5. The robot control device according to claim 4, wherein the circuitry is further configured to set a reaction level of the reaction of the robot based on the magnitude of the external force.

6. The robot control device according to claim 1, wherein the circuitry is further configured to vary a reaction of the robot in the interaction based on an attribute of the user who touches the movable part to apply the external force.

7. The robot control device according to claim 6, wherein the circuitry is further configured to set the reaction based on a robot's degree of recognition of the user.

8. The robot control device according to claim 1, wherein the circuitry is further configured to vary a reaction of the robot in the interaction based on an emotion set for the robot.

9. The robot control device according to claim 8, wherein the circuitry is further configured to set the reaction to be larger when the emotion is a negative emotion than the reaction when the emotion is a positive emotion.

10. The robot control device according to claim 1, wherein the circuitry is further configured to vary a reaction of the robot in the interaction based on a frequency with which the external force is applied.

11. The robot control device according to claim 10, wherein the circuitry is further configured to:

set a first reaction of the robot for a first frequency with which the external force is applied, set a second reaction of the robot for a second frequency with which the external force is applied, the first reaction is larger than the second reaction when the first frequency is greater than the second frequency, and the reaction includes the first reaction and the second reaction.

12. The robot control device according to claim 1, wherein the circuitry is further configured to detect the external force based on a measurement value obtained by a joint angle sensor that measures an angle of the joint, a current value in the motor that drives the joint, and a command value for the angle of the joint.

13. The robot control device according to claim 12, wherein the circuitry is further configured to estimate the external force based on the current value and a deviation between the measurement value and the command value.

14. A robot control method, comprising:

determining an external force determination value, which indicates whether an external force is applied a movable part of a robot, from a motor associated with a joint of the robot;

obtaining information associated with a touching manner based on an application of machine learning using the external force determination value, a state of the robot, and a feature of a user who touches the robot, wherein the touching manner is a manner of a touch of the user on the robot;

detecting the external force based on a basis of a parameter obtained from the joint driving the movable part;

controlling an interaction of the robot based on the detected external force; and controlling the motor associated with the joint based on the information associated with the touching manner.

15. A non-transitory computer-readable medium having stored thereon, computer-readable instructions, which when executed by a computer, causes the computer to execute operations, the operations comprising:

determining an external force determination value, which indicates whether an external force is applied a movable part of a robot, from a motor associated with a joint of the robot;

obtaining information associated with a touching manner based on an application of machine learning using the external force determination value, a state of the robot, and a feature of a user who touches the robot, wherein the touching manner is a manner of a touch of the user on the robot;

detecting the external force based on a parameter obtained from the joint driving the movable part;

controlling an interaction of the robot based on the detected external force; and controlling the motor associated with the joint based on the information associated with the touching manner.

* * * * *